United States Patent
Jamshidi Roudbari et al.

(10) Patent No.: US 8,982,310 B2
(45) Date of Patent: Mar. 17, 2015

(54) DISPLAYS WITH LIGHT-CURABLE SEALANT

(75) Inventors: Abbas Jamshidi Roudbari, Sunnyvale, CA (US); Young-Bae Park, San Jose, CA (US); Shih-Chang Chang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 399 days.

(21) Appl. No.: 13/326,713

(22) Filed: Dec. 15, 2011

(65) Prior Publication Data

US 2013/0154949 A1   Jun. 20, 2013

(51) Int. Cl.
| | | |
|---|---|---|
| G02F 1/1333 | (2006.01) | |
| G02F 1/1339 | (2006.01) | |
| G06F 3/041 | (2006.01) | |

(52) U.S. Cl.
CPC ........ *G02F 1/1339* (2013.01); *G02F 2202/023* (2013.01); *G06F 3/041* (2013.01); *G06F 2203/04103* (2013.01); *G06F 2203/04113* (2013.01)
USPC ............................. 349/153; 349/110; 349/190

(58) Field of Classification Search
CPC ................. G02F 2001/1351; G02F 2001/1352
USPC .................................................. 349/153, 190
See application file for complete search history.

(56) References Cited

U.S. PATENT DOCUMENTS

| | | | |
|---|---|---|---|
| 7,746,428 B2 | 6/2010 | Kobayashi et al. | |
| 7,898,633 B2 | 3/2011 | Ishii et al. | |
| 2002/0167634 A1* | 11/2002 | Watanabe et al. | 349/153 |
| 2007/0195029 A1* | 8/2007 | Jeon et al. | 345/87 |
| 2007/0263159 A1* | 11/2007 | Kobayashi et al. | 349/153 |
| 2007/0273821 A1 | 11/2007 | Liou et al. | |
| 2009/0303427 A1* | 12/2009 | Kondo et al. | 349/153 |
| 2010/0253638 A1* | 10/2010 | Yousefpor et al. | 345/173 |
| 2011/0181808 A1* | 7/2011 | Kobayashi et al. | 349/61 |

FOREIGN PATENT DOCUMENTS

JP     2009145442     7/2009

* cited by examiner

*Primary Examiner* — Dennis Y Kim
(74) *Attorney, Agent, or Firm* — Treyz Law Group; Kendall P. Woodruff

(57) ABSTRACT

An electronic device may have a display such as a liquid crystal display. The display may include a layer of liquid crystal material interposed between a color filter layer and a thin-film transistor layer. The thin-film transistor layer may be provided with capacitive touch sensor electrodes. Wide metal lines on the thin-film transistor layer may be used to inhibit parasitic capacitances during touch sensor mode. The color filter layer may include a layer of black masking material that surrounds the active display area. A light-curable adhesive may used to attach the color filter layer to the thin-film transistor layer. Openings may be formed in the black masking material and in the metal lines on the thin-film transistor layer. The adhesive may be cured by applying ultraviolet light to the adhesive through the openings in the black masking material and through the openings in the metal lines.

20 Claims, 16 Drawing Sheets

DISPLAYS WITH LIGHT-CURABLE SEALANT

BACKGROUND

This relates generally to electronic devices and, more particularly, to displays for electronic devices.

Electronic devices such as computers and cellular telephones are generally provided with displays. Displays such as liquid crystal displays contain a thin layer of liquid crystal material. Color liquid crystal displays include color filter layers. The layer of liquid crystal material in this type of display is interposed between the color filter layer and a thin-film transistor layer. Touch sensor structures may be incorporated into the thin-film transistor layer.

A light-curable sealant is used to attach the color filter layer to the liquid crystal layer. The light-curable sealant may be disposed along the edges of the thin-film transistor layer and may form a peripheral border around the liquid crystal material. The light-curable sealant may overlap conductive structures such as metal lines that run along the edges of the thin-film transistor layer.

In conventional devices, openings are formed in the metal lines that run along the edges of the thin-film transistor layer. The light-curable sealant is cured by applying ultraviolet light to the light-curable sealant through the openings in the metal lines. However, the openings in the metal lines on the thin-film transistor layer reduce the effective width of the metal lines and thus increase the resistance of the metal lines. Increasing the resistance of these metal lines may lead to poor electrical performance. Moreover, increasing the width of the metal lines to compensate for the openings may add undesirable width to the border of inactive display area around the periphery of a display.

It would therefore be desirable to be able to provide improved ways of sealing layers of a display in an electronic device.

SUMMARY

An electronic device may have a display. The display may have an array of display pixels. The array of display pixels may display images for a user in an active area of the display. The display may be a liquid crystal display that has a layer of liquid crystal material interposed between a color filter layer and a thin-film transistor layer.

The thin-film transistor layer may be provided with electrodes that control electric fields that are applied to the liquid crystal material. The thin-film transistor layer may also be include capacitive touch sensor electrodes to provide the display with touch screen capabilities. At recurring time intervals, the image display functions of the display may be temporarily paused so that touch data can be gathered. During these time intervals, the display may operate in touch sensor mode. Metal lines that run along the edges of the thin-film transistor layer may be used to help hold gate lines in the display at a direct current (DC) voltage to prevent touch sensor signals from being capacitively coupled through the gate lines.

The color filter layer may include a layer of black masking material. The black masking material may surround the active area of the display.

A light-curable sealant may be used to attach the color filter layer to the thin-film transistor layer. The light-curable sealant may surround the liquid crystal material and may prevent leakage of liquid crystal material at the edges of the display. The black masking material on the color filter layer may have a peripheral border region that overlaps the light-curable sealant. The light-curable sealant may overlap portions of the metal lines on the thin-film transistor layer.

A pattern of openings may be distributed along the peripheral border region of the black masking material. A complementary pattern of openings may be distributed along the metal lines on the thin-film transistor layer. The openings in the black masking material may expose a first portion of the light-curable sealant, while the openings in the metal lines may expose a second portion of the light-curable sealant. The light-curable sealant may be cured by applying ultraviolet light to the light-curable sealant through the openings in the black masking material and through the openings in the metal lines.

In some embodiments, openings may be formed in the black masking layer, and the metal lines may be formed without openings. The light-curable sealant is then cured by applying ultraviolet light to the light-curable sealant through the openings in the black masking material.

Further features of the invention, its nature and various advantages will be more apparent from the accompanying drawings and the following detailed description of the preferred embodiments.

DETAILED DESCRIPTION

Figure 1:
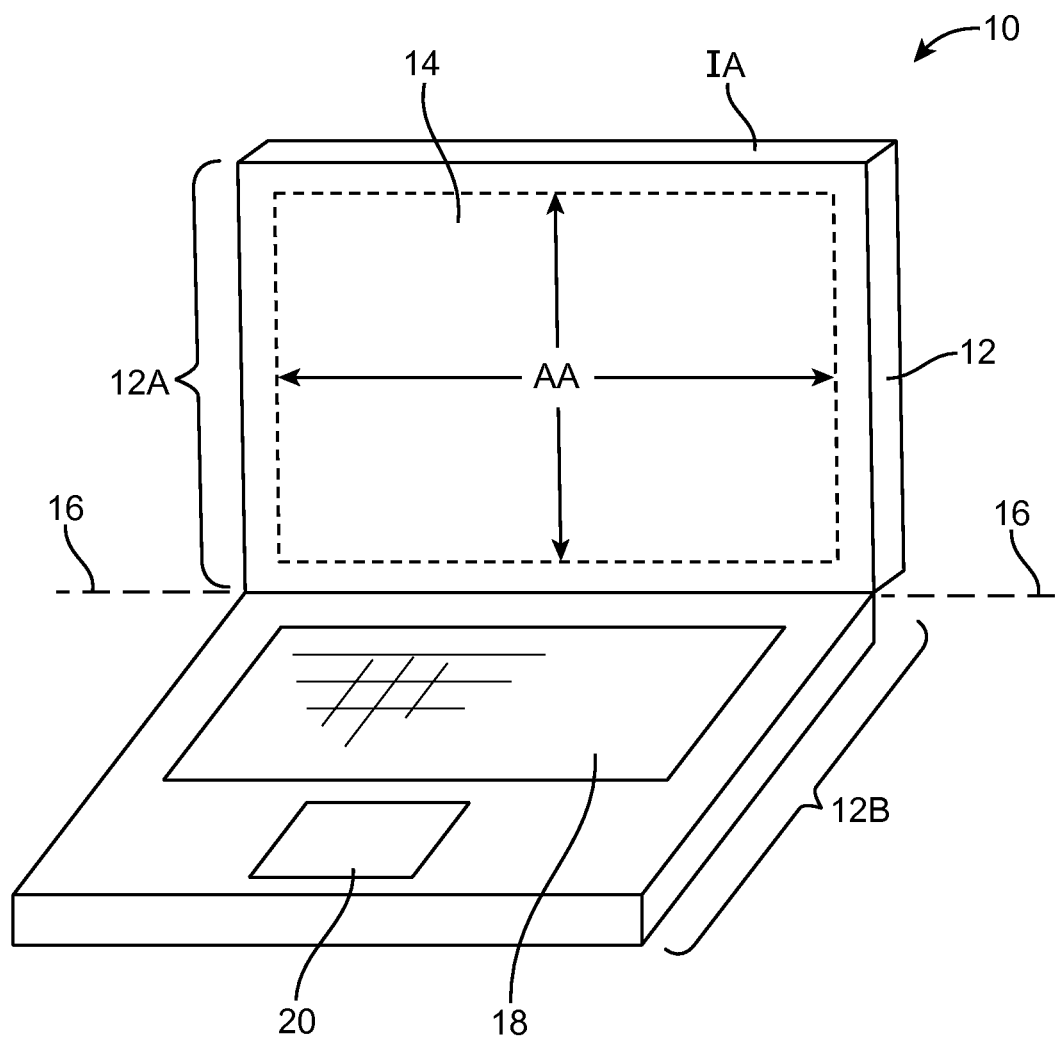
FIG. 1 is a diagram of an illustrative electronic device with a display such as a portable computer in accordance with an embodiment of the present invention.

An illustrative electronic device of the type that may be provided with a display is shown in FIG. 1. Electronic device 10 may be a computer such as a computer that is integrated into a display such as a computer monitor, a laptop computer, a tablet computer, a somewhat smaller portable device such as a wrist-watch device, pendant device, or other wearable or miniature device, a cellular telephone, a media player, a tablet computer, a gaming device, a navigation device, a computer monitor, a television, or other electronic equipment.

As shown in FIG. 1, device 10 may include a display such as display 14. Display 14 may be a touch screen that incorporates capacitive touch electrodes or other touch sensor components or may be a display that is not touch sensitive. Display 14 may include image pixels formed from liquid crystal display (LCD) components or other suitable display pixel structures. Arrangements in which display 14 is formed using liquid crystal display pixels are sometimes described herein as an example. This is, however, merely illustrative. Any suitable type of display technology may be used in forming display 14 if desired.

Device 10 may have a housing such as housing 12. Housing 12, which may sometimes be referred to as a case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.).

As shown in FIG. 1, housing 12 may have multiple parts. For example, housing 12 may have upper portion 12A and lower portion 12B. Upper portion 12A may be coupled to lower portion 12B using a hinge that allows portion 12A to rotate about rotational axis 16 relative to portion 12B. A keyboard such as keyboard 18 and a touch pad such as touch pad 20 may be mounted in housing portion 12B.

Display 14 may have an active area such as active area AA and an inactive area such as area IA. Active area AA may be, for example, a rectangular region in the center of display 14 in which display pixels are actively used to display images for a user of device 10. Inactive area IA may be devoid of active display pixels. In the example of FIG. 1, inactive area IA has the shape of a rectangular ring, surrounding the periphery of active area AA of display 14.

Circuitry and other components may sometimes be formed in inactive area IA. To hide the circuitry and other components from view by a user of device 10, inactive area IA may sometimes be provided with an opaque mask. The opaque mask can be formed from an opaque material such as a black pigmented polymer material or may be formed from opaque masking materials of other colors. Configurations in which the opaque masking material in display 14 has a black appearance are sometimes described herein as an example. This is, however, merely illustrative. Opaque masking layers in device 10 may have any suitable color.

Figure 2:
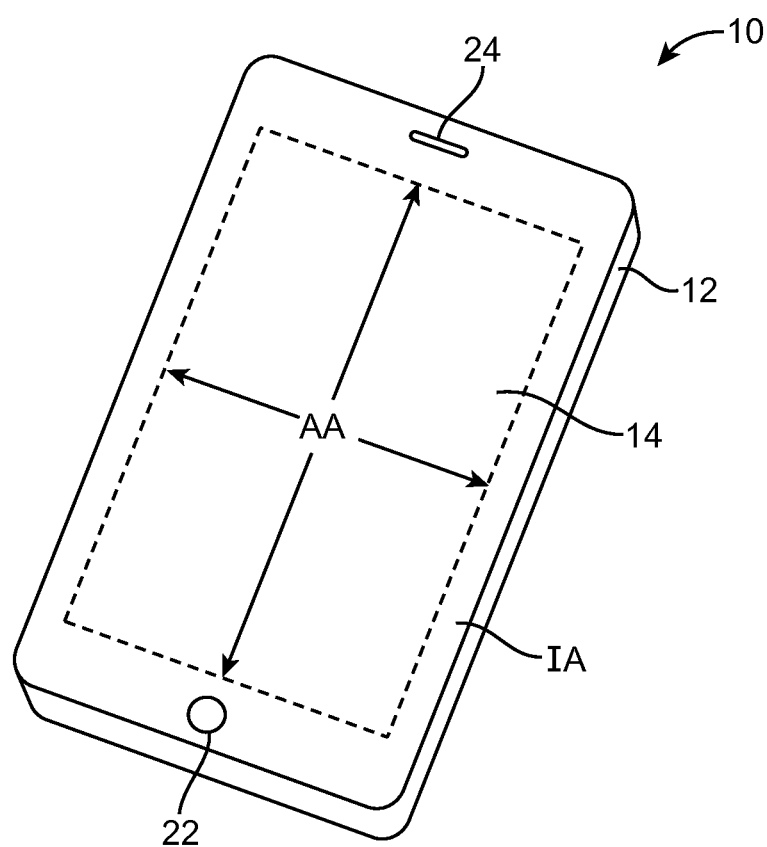
FIG. 2 is a diagram of an illustrative electronic device with a display such as a cellular telephone or other handheld device in accordance with an embodiment of the present invention.

In the example of FIG. 2, device 10 has been implemented using a housing that is sufficiently small to fit within a user's hand (e.g., device 10 of FIG. 2 may be a handheld electronic device such as a cellular telephone). As show in FIG. 2, device 10 may include a display such as display 14 mounted on the front of housing 12. Display 14 may be substantially filled with active display pixels or may have an inactive portion such as inactive portion IA that surrounds an active portion such as active portion AA. Display 14 may have openings (e.g., openings in inactive region IA or active region AA of display 14) such as an opening to accommodate button 22 and an opening to accommodate speaker port 24.

Figure 3:
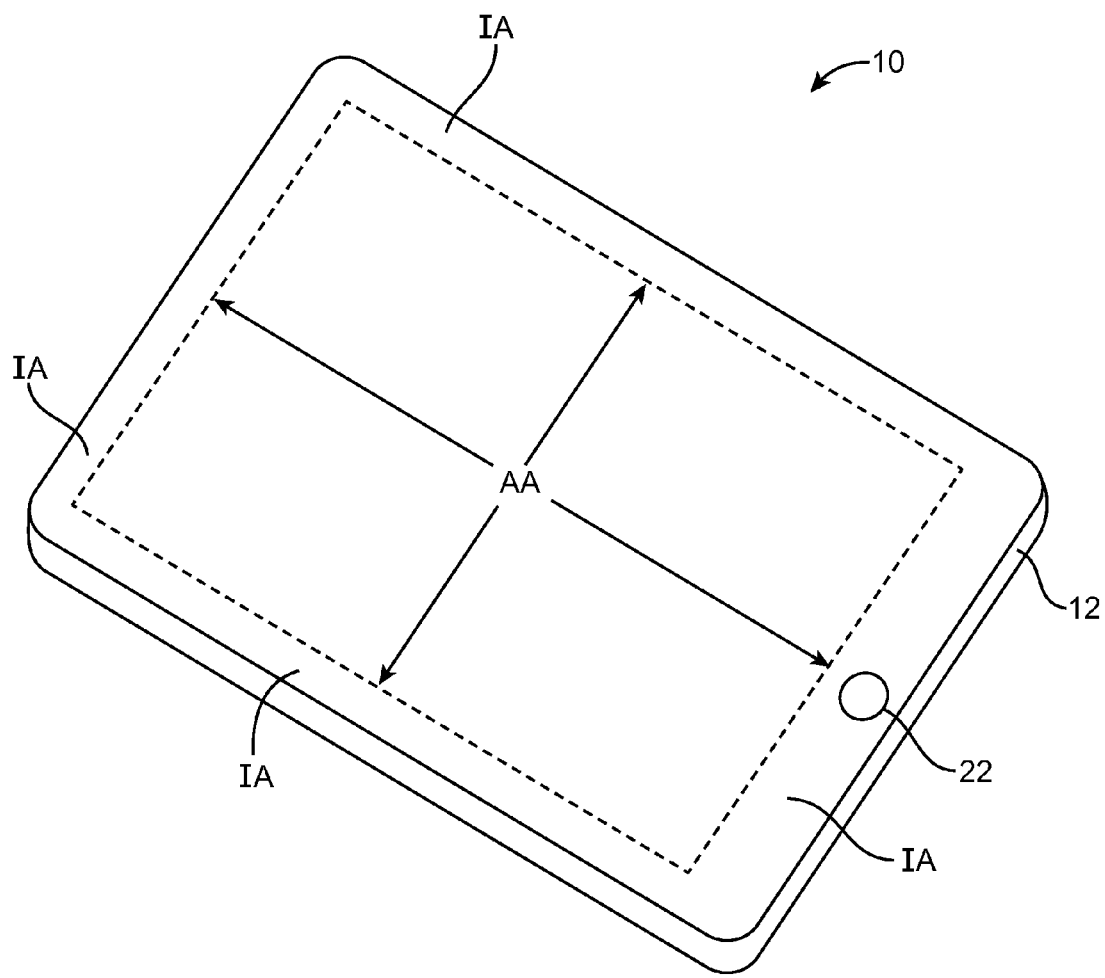
FIG. 3 is a diagram of an illustrative electronic device with a display such as a tablet computer in accordance with an embodiment of the present invention.

FIG. 3 is a perspective view of electronic device 10 in a configuration in which electronic device 10 has been implemented in the form of a tablet computer. As shown in FIG. 3, display 14 may be mounted on the upper (front) surface of housing 12. An opening may be formed in display 14 to accommodate button 22 (e.g., in inactive region IA surrounding active region AA).

Figure 4:
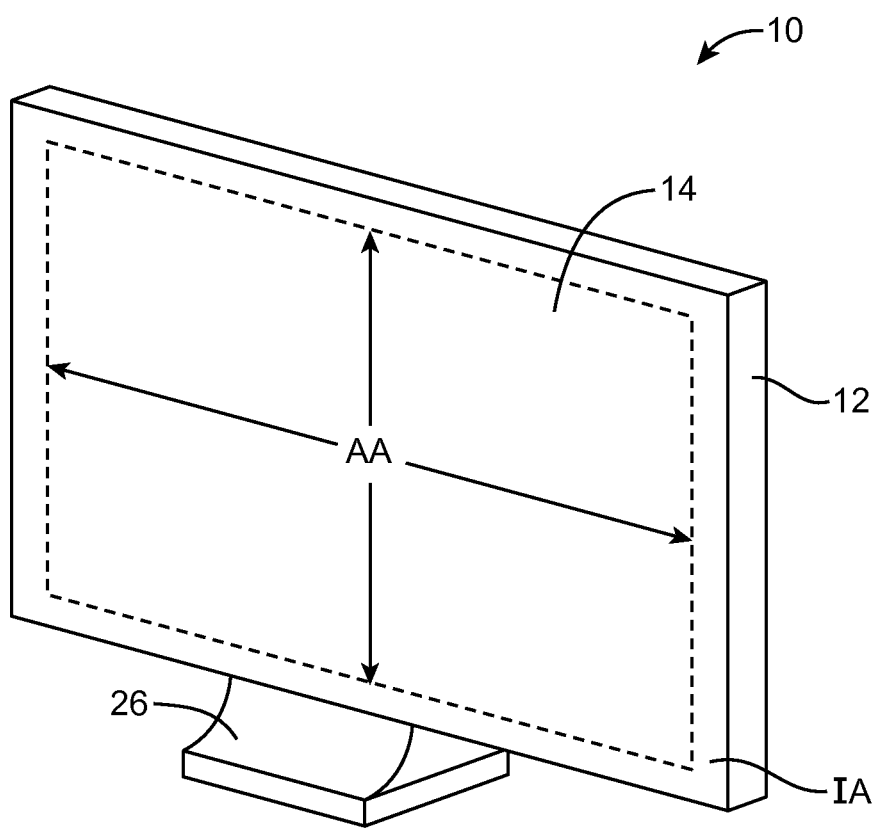
FIG. 4 is a diagram of an illustrative electronic device with a display such as a computer monitor with a built-in computer in accordance with an embodiment of the present invention.

FIG. 4 is a perspective view of electronic device 10 in a configuration in which electronic device 10 has been implemented in the form of a computer integrated into a computer monitor. As shown in FIG. 4, display 14 may be mounted on the front surface of housing 12. Stand 26 may be used to support housing 12. Display 14 may include an inactive region such as inactive region IA that surrounds active region AA.

If desired, display 14 may be configured so as to minimize or eliminate the size of inactive region IA along one or more edges of active region AA. Configurations in which inactive region IA extends along all four edges of a rectangular active region AA are described herein as an example.

Figure 5:
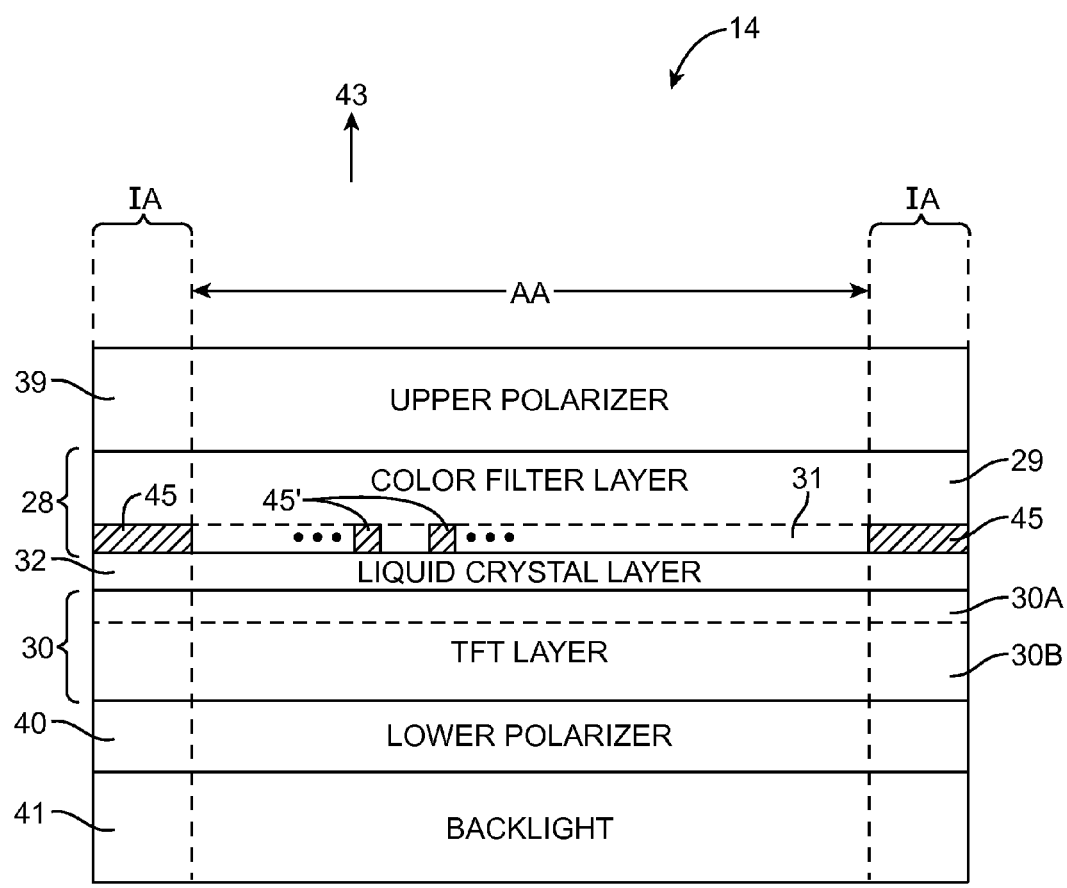
FIG. 5 is cross-sectional side view of a display in accordance with an embodiment of the present invention.

A cross-sectional side view of a portion of a display of the type that may be used in forming display 14 of FIGS. 1-4 is shown in FIG. 5. As shown in FIG. 5, display 14 may include color filter (CF) layer 28 and thin-film transistor (TFT) layer 30. Color filter layer 28 may include an array of color filter elements formed on a display substrate. As shown in FIG. 5, color filter array 31 may be formed on the interior surface of color filter substrate 29 in active area AA of display 14.

Color filter layer 28 may also include a layer of opaque masking material such as black masking material 45. Black masking material 45 (sometimes referred to as a black masking layer or black matrix layer) may be formed on the interior surface of color filter substrate 29 and may form an opaque peripheral border that surrounds active area AA of display 14. Opaque masking material such as black masking material 45' may also be formed inside active area AA of display 14. Black masking material 45' may be used in between adjacent colored pixels in active area AA to prevent color mixing. Black masking material that is used in the active portion of a display is sometimes referred to as a black matrix or black matrix layer. In a typical arrangement, black matrix layer 45' is provided with color filter element openings distributed throughout active area AA. Each opening may be provided with a color filter element (e.g., a red, green, or blue color filter element).

Liquid crystal (LC) layer 32 includes liquid crystal material and may be interposed between color filter layer 28 and thin-film transistor layer 30. Thin-film transistor layer 30 may include display circuitry 30A formed on a dielectric substrate such as TFT substrate 30B. Display circuitry 30A may include display driver circuitry (e.g., one or more display driver integrated circuits), thin-film transistor circuitry (e.g., polysilicon transistor circuitry or amorphous silicon transistor circuitry), metal lines, capacitors, electrodes for controlling the electric fields that are applied to liquid crystal layer 32, and capacitive touch sensor electrodes.

Suitable materials that may be used for display substrates 29 and 30B include planar glass substrates, plastic substrates, or sheets of other suitable substrate materials.

Display 14 may have upper and lower polarizer layers 39 and 40. Backlight unit 41 may provide backside illumination for display 14. Backlight 41 may include a light source such as a strip of light-emitting diodes. Backlight 41 may also include a light-guide plate and a back reflector. The back reflector may be located on the lower surface of the light-guide panel to prevent light leakage. Light from the light source may be injected into an edge of the light-guide panel and may scatter upwards in direction 43 through display 14.

An optional cover layer such as a layer of cover glass may be used to cover and protect the layers of display 14 that are shown in FIG. 5. Other layers that may be included in display 14 include optical film layers (e.g., structures such as quarter-wave plates, half-wave plates, diffusing films, optical adhesives, and birefringent compensating layers), shielding layers (e.g., for preventing electric fields from disrupting the operation of the display), heat sinking layers (e.g., for conducting heat away from the display), and other suitable display layers.

Touch sensor structures may be incorporated into one or more of the layers of display 14. In a typical touch sensor configuration, an array of capacitive touch sensor electrodes may be implemented using pads and/or strips of a transparent conductive material such as indium tin oxide. Other touch technologies may be used if desired (e.g., resistive touch, acoustic touch, optical touch, etc.). Indium tin oxide or other transparent conductive materials or non-transparent conductors may also be used in forming signal lines in display 14 (e.g., structures for conveying data, power, control signals, etc.). Touch sensor structures and circuitry may be included with display circuitry 30A on TFT substrate 30B.

In black and white displays, color filter layer 28 can be omitted. In color displays, color filter layer 28 can be used to impart colors to an array of image pixels. Each image pixel may, for example, have three corresponding subpixels. Each subpixel may be associated with a separate color filter element in color filter array 31. The color filter elements may, for example, include red (R) color filter elements, blue (B) color filter elements, and green (G) color filter elements. These elements may be arranged in rows and columns. For example, color filter elements can be arranged in stripes across the width of display 14 (e.g., in a repeating patterns such as a RBG pattern or BRG pattern) so that the color filter elements in each column are the same (i.e., so that each column contains all red elements, all blue elements, or all green elements). By controlling the amount of light transmission through each subpixel, a desired colored image can be displayed.

The amount of light transmitted through each subpixel can be controlled using display control circuitry and electrodes. Each subpixel may, for example, be provided with a transparent indium tin oxide electrode. The signal on the subpixel electrode, which controls the electric field through an associated portion of the liquid crystal layer and thereby controls the light transmission for the subpixel, may be applied using a thin-film transistor. The thin-film transistor may receive data signals from data lines and, when turned on by an associated gate line, may apply the data line signals to the electrode that is associated with that thin-film transistor.

Figure 6:
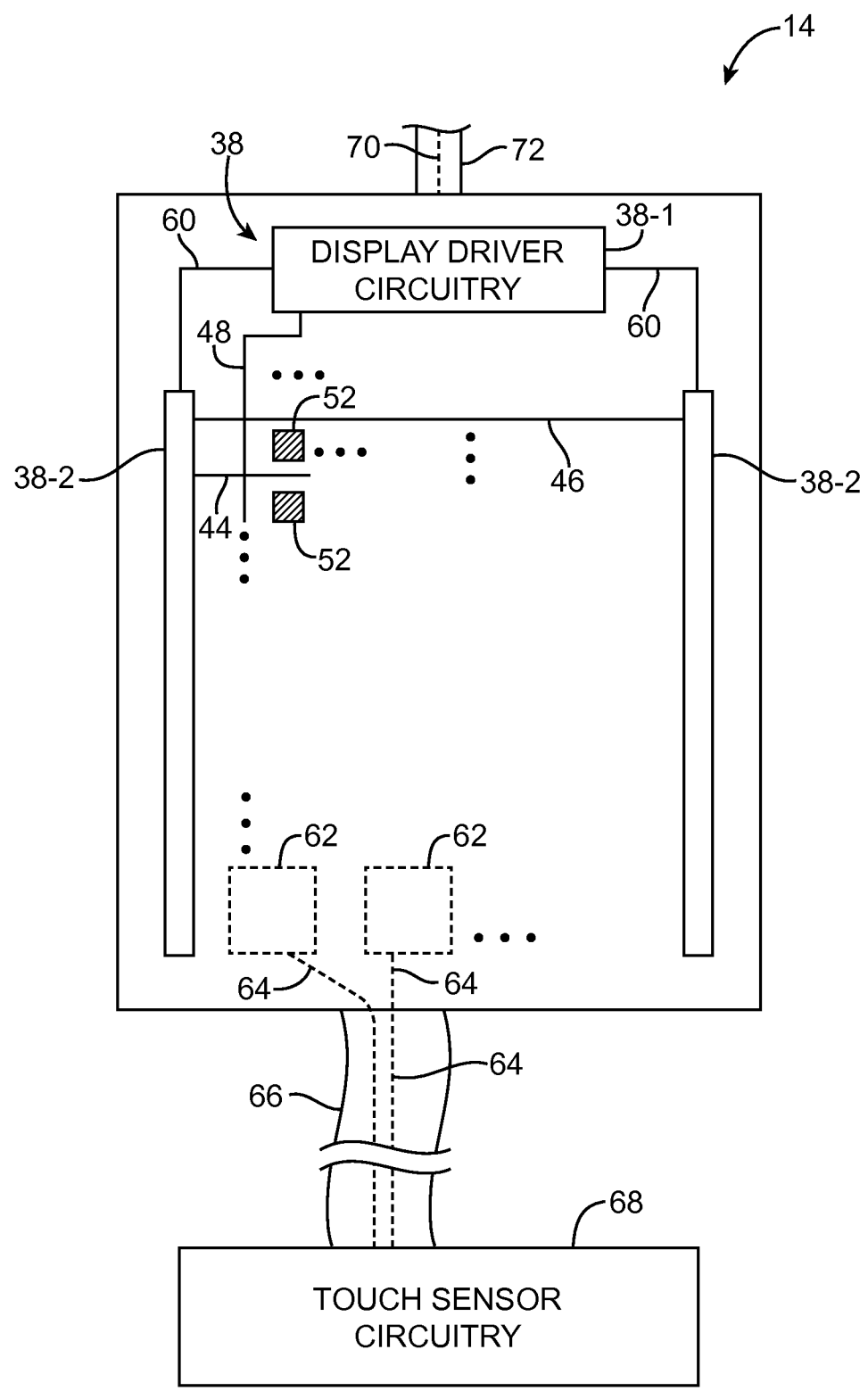
FIG. 6 is a diagram showing how a display may be provided with image pixel structures and touch sensor elements in accordance with an embodiment of the present invention.

A top view of an illustrative display is shown in FIG. 6. As shown in FIG. 6, display 14 may include an array of image pixels 52. Each image pixel may have an electrode that receives a data line signal from an associated transistor and a ground electrode. The ground electrodes of display 14 may be formed from a layer of patterned of indium tin oxide or other conductive planar structures. The patterned indium tin oxide structure or other conductive structures that are used in forming the ground plane for image pixels 52 may also be used in forming capacitive touch sensor elements 62.

As illustrated by touch sensor elements 62 of FIG. 6, touch sensor elements (electrodes) may be coupled to touch sensor circuitry 68. Touch sensor elements 62 may include rectangular pads of conductive material, vertical and/or horizontal strips of conductive material, and other conductive structures. Signals from elements 62 may be routed to touch sensor processing circuitry 68 via traces 64 on flex circuit cable 66 or other suitable communications path lines.

In a typical arrangement, there are fewer capacitor electrodes 62 in display 14 than there are image pixels 52, due to the general desire to provide more image resolution than touch sensor resolution. For example, there may be hundreds or thousands of rows and/or columns of pixels 52 in display 14 and only tens or hundreds of rows and/or columns of capacitor electrodes 62.

Display 14 may include display driver circuitry 38. Display driver circuitry 38 may receive image data from processing circuitry in device 10 using conductive lines 70 in path 72. Path 72 may be, for example, a flex circuit cable or other communications path that couples display driver circuitry 38 to integrated circuits on a printed circuit board elsewhere in device 10 (as an example).

Display driver circuitry 38 may include circuitry 38-1 and circuitry 38-2. Circuitry 38-1 may be implemented using one or more integrated circuits (e.g., one or more display driver integrated circuits). Circuitry 38-2 (sometimes referred to as gate line and Vcom driver circuitry or gate line driver circuitry) may be incorporated into circuitry 38-1 or may be implemented using thin-film transistors in layer 30A (FIG. 5). Gate line driver circuitry 38-2 may be located on both the left and right sides of the pixel array (as shown in FIG. 6) or may be located on only one side of the pixel array. Paths such as paths 60 may be used to interconnect display driver circuitry 38-1 and 38-2. Display driver circuitry 38 may also be implemented using external circuits or other combinations of circuitry, if desired.

Display driver circuitry 38 may control the operation of display 14 using a grid of signal lines such as data lines 48, gate lines 46, and Vcom lines (paths) 44. Lines 48, 46, and 44 may form conductive paths for signals that control an array of image subpixels such as subpixels 52 in display 14. Subpixels 52 (which are sometimes referred to as pixels) may each be formed from electrodes that give rise to an electric field and a portion of liquid crystal layer 32 (FIG. 5) that is controlled by that electric field.

Figure 7:
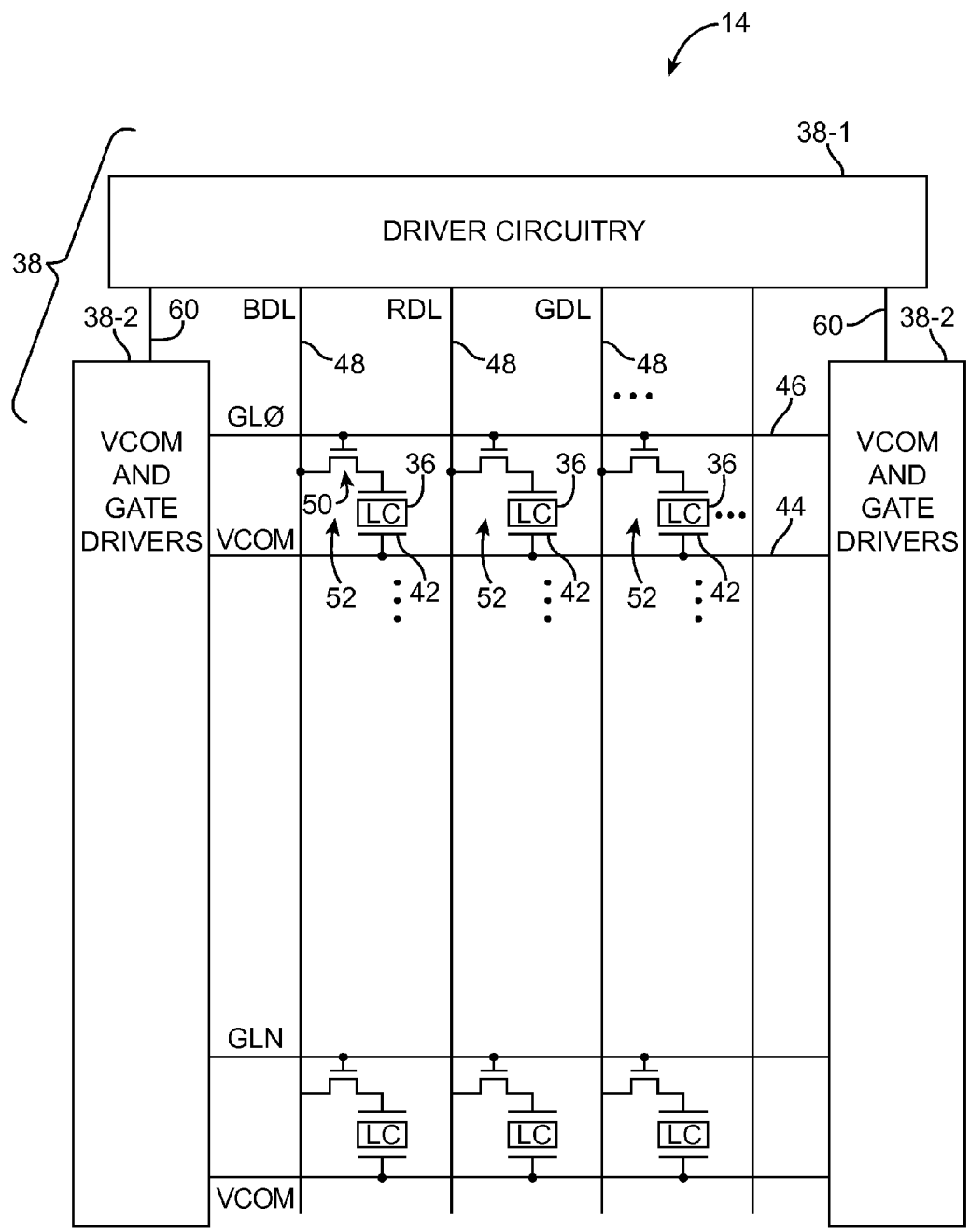
FIG. 7 is a circuit diagram of an illustrative display having rows and columns of image pixels in accordance with an embodiment of the present invention.

As shown in FIG. 7, pixels 52 in display 14 may each be associated with a portion such as portion 36 of liquid crystal layer 32 of FIG. 5. By controlling transmission through pixels 52, images may be displayed on display 14.

Data lines 48 may include lines for addressing pixels of different colors (i.e., pixels associated with color filter elements of different colors). For example, data lines 48 may include blue data lines that carry blue data line signals BDL, red data lines that carry red data line signals RDL, and green data lines that carry green data line signals GDL. Signals BDL, RDL, and GDL may be analog signals having voltages ranging from −5 volts to 5 volts (as an example).

In each row of the pixel array of display 14, a given one of lines 44 may be used to provide a voltage Vcom (sometimes referred to as a reference voltage, power plane voltage or ground voltage) to the set of electrodes 42 in that row. Digital gate line control signals GL0 . . . GLN may be generated on respective gate lines 46 by driver circuitry 38-2. Each gate line 46 may be coupled to the gate of an associated one of control transistors 50 in the same row as that gate line. When a row of control transistors 50 is turned on by asserting a given gate line control signal, the control transistors in that row will each route the voltage on their associated data line to their associated electrode 40. The voltage difference between each electrode 40 and its associated electrode 42 gives rise to an electric field that is used in controlling the state of the liquid crystal material in an associated liquid crystal portion 36 (i.e., a portion of layer 32 of FIG. 5).

Figure 8:
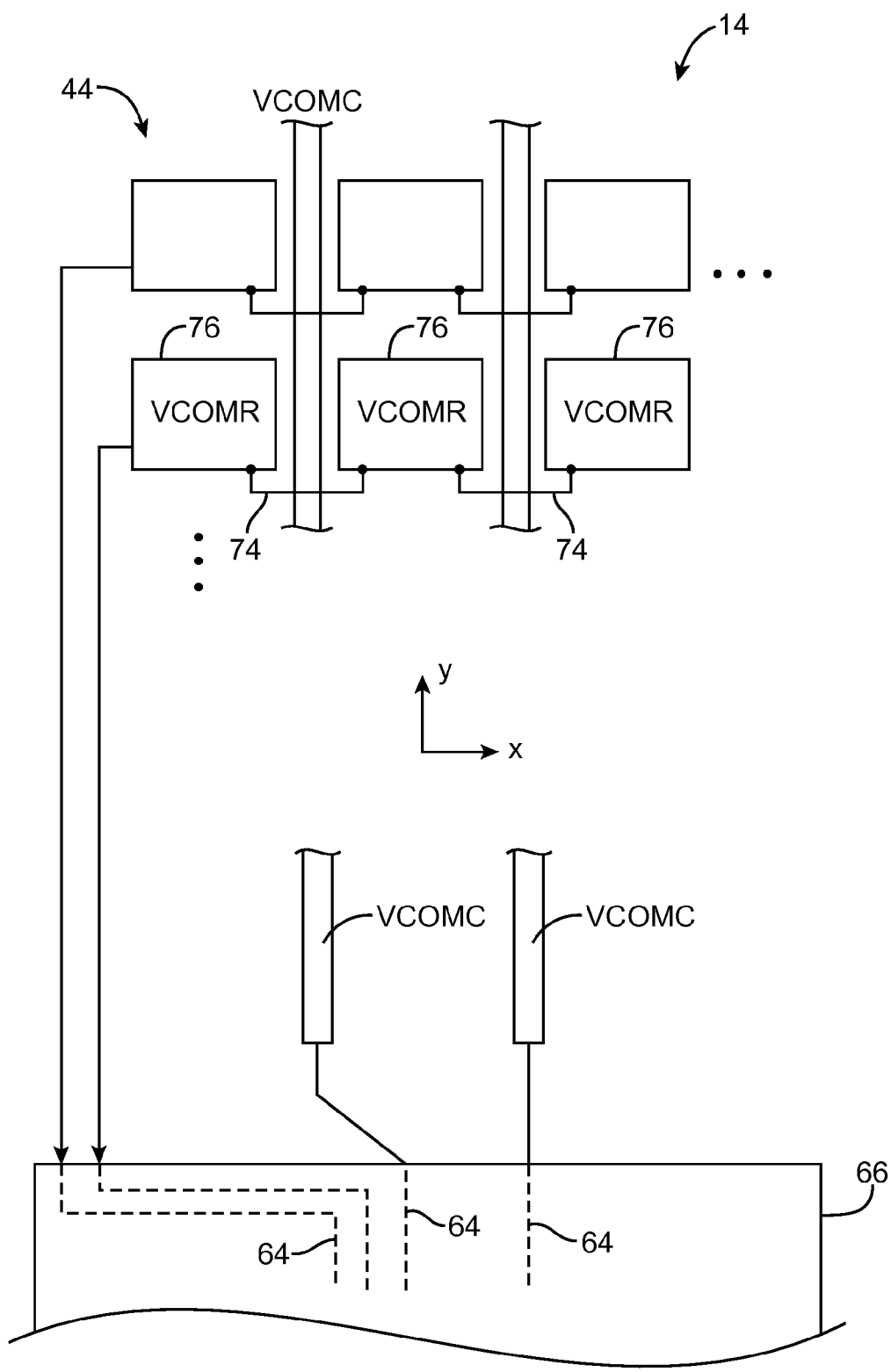
FIG. 8 is a top view of a portion of a display showing how touch sensor structures may be incorporated into the display circuitry in accordance with an embodiment of the present invention.

An illustrative layout that may be used in implementing Vcom paths 44 of FIG. 7 for display 14 is shown in FIG. 8. As shown in FIG. 8, display 14 may include Vcom conductor structures 44 such as square Vcom pads 76 that are interconnected using conductive Vcom jumpers 74 to form Vcom rows (called Vcomr). Vertical Vcom conductors (called Vcomc) may be interspersed with pads 76. The Vcomr and Vcomc conductors of FIG. 8 may be formed from indium tin oxide or other transparent conductive material and may be used for supporting both display and touch functions in display 14. For example, a time division multiplexing scheme may be used to allow the Vcom conductive structures to be used both as ground plane structures for pixels 52 (during display mode operations) and as touch sensor electrodes (during touch sensor mode operations).

When pixels 52 of display 14 are being used to display an image on display 14, display driver circuitry 38 (FIG. 6) may, for example, short both Vcomc and Vcomr to a ground voltage such as 0 volts or other suitable voltage (e.g., a fixed reference voltage). In this configuration, the Vcomr and Vcomc conductors may work together to serve as a part of a common ground plane (conductive plane) for display 14. Because Vcomc and Vcomr are shorted together when displaying images in this way, no position-dependent touch data is gathered.

At recurring time intervals, the image display functions of display 14 may be temporarily paused so that touch data can be gathered. During these time intervals (sometimes referred to as display blanking intervals), the display may operate in touch sensor mode. When operating in touch sensor mode, the Vcomc and Vcomr conductors may be operated independently, so that the position of a touch event can be detected in dimensions X and Y. There are multiple Vcom rows (Vcomr), which allows discrimination of touch position with respect to dimension Y. There are also multiple Vcom columns (Vcomc), which allows touch position to be determined in dimension X. The Vcomc and Vcomr conductors of FIG. 8 are illustrated schematically as touch sensor electrodes 62 in FIG. 6.

Figure 9:
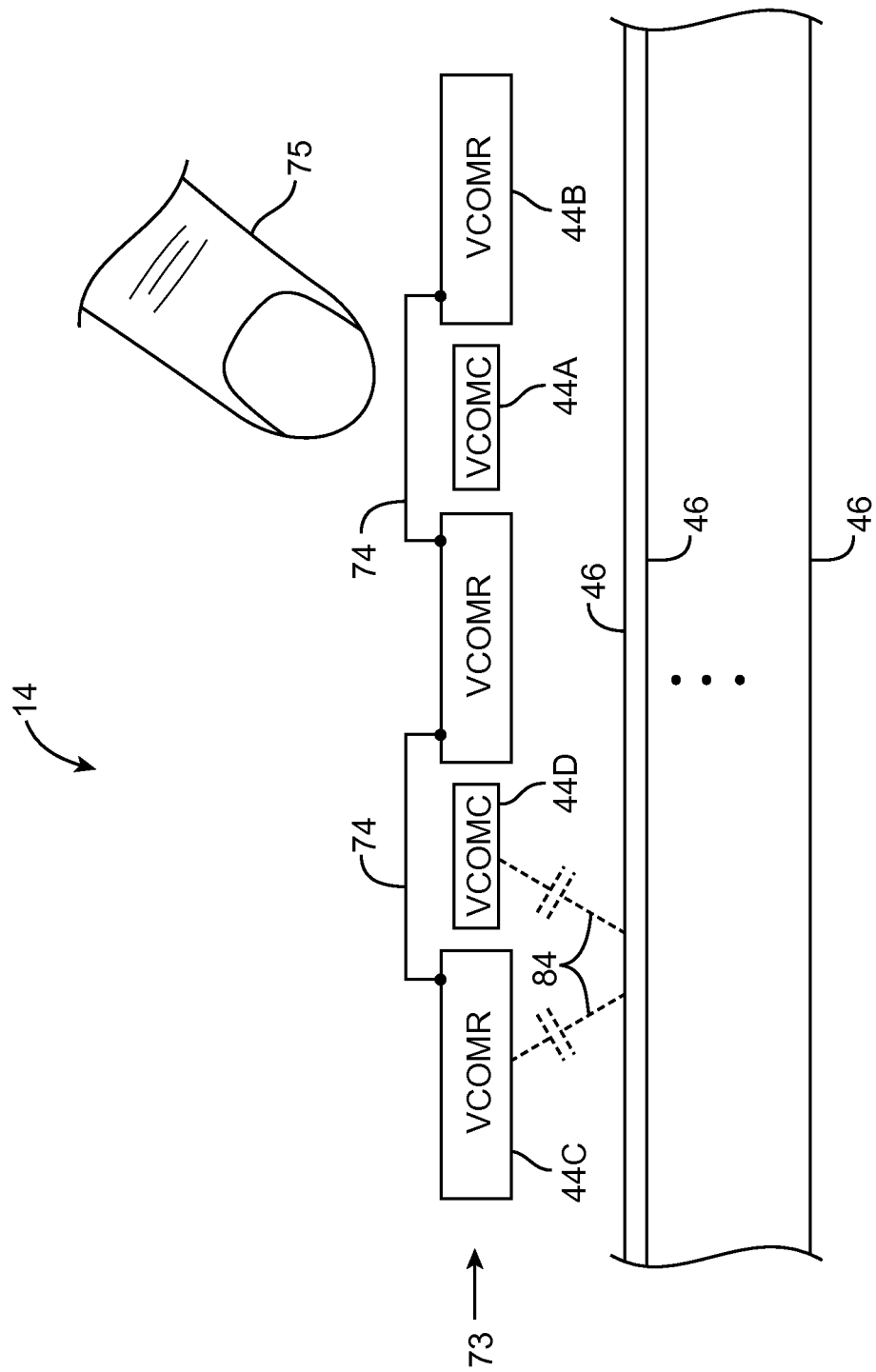
FIG. 9 is a top view of a portion of a display illustrating how conductive structures in the display are used to detect a touch event in accordance with an embodiment of the present invention.

During touch sensor mode, a drive signal may be driven across a row of Vcomr conductors such as row 73 of FIG. 9. When a user's finger or other external object 75 is placed in the vicinity of a pair of touch sensor electrodes (such as Vcomc conductor 44A and Vcomr conductor 44B), changes in the capacitive coupling between the pair of electrodes may be detected by sensor circuitry 68 (FIG. 6) and converted into touch event data for device 10. Parasitic capacitances may arise between the Vcom structures and other conductive structures in the display. For example, capacitive coupling 84 may occur between Vcom conductors such as Vcom conductors 44C and 44D and gate lines 46. These parasitic capacitances may lead to poor touch sensor performance for the device because they may allow touch sensor signals to reach multiple Vcomc conductors from a given Vcomr conductor via gate lines 46. To ensure that the drive signal does not induce capacitive coupling between Vcom conductors 44 and gate lines 46, gate lines 46 may be held at strongly at a direct current (DC) voltage during touch sensor mode. For example, during touch sensor mode (e.g., during display blanking intervals), gate lines 46 may be held at a DC voltage ranging from −15 volts to −5 volts (as an example) to attenuate noise signal coupling through gate lines 46.

Figure 10:
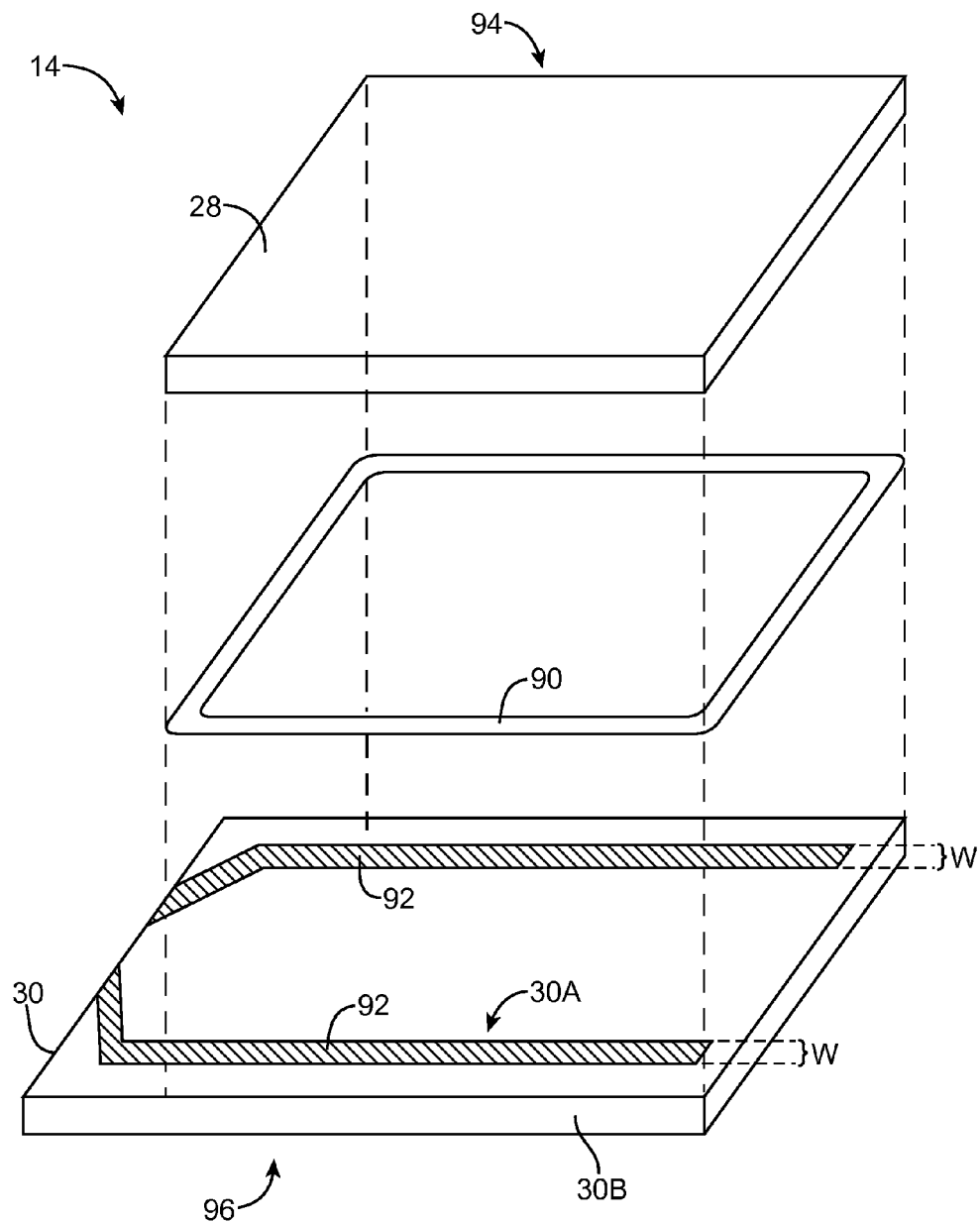
FIG. 10 is an exploded view of a portion of a display illustrating how a light-curable adhesive may be used to attach layers of a display in accordance with an embodiment of the present invention.

Once display circuitry 30A is formed on TFT substrate 30B, color filter layer 28 may be attached to TFT layer 30. As shown in the exploded view of FIG. 10, a light-curable sealant such as ultraviolet-light-curable sealant 90 may be used to secure color filter layer 28 to TFT layer 30. Sealant 90 may form a peripheral border that surrounds liquid crystal material 32 (FIG. 5) and that prevents leakage of liquid crystal material 32 at the edges of display 14. Sealing adhesive 90 may be a light-curable adhesive such as ultraviolet (UV) epoxy or other UV-curable sealant.

UV-curable sealant 90 may be disposed around the edges of TFT layer 30 and may overlap some of the conductive structures on TFT substrate 30B such as opaque metal lines 92. Metal lines 92 (sometimes referred to as VGL lines) may form part of display circuitry 30A formed on TFT substrate 30B. In some configurations, VGL lines 92 may be used to supply a low logic voltage to gate lines 46 (FIGS. 6, 7, and 9) during display blanking intervals. For example, during display blanking intervals, gate driver circuitry 38-2 may receive a signal on VGL lines 92. Switching circuitry contained in gate driver circuitry 38-2 may then be configured to short gate lines 46 to VGL lines 92 to hold gate lines 46 at low voltage. Metal lines 92 may have sufficient width (and thus sufficiently low resistance) to firmly hold gate lines 46 at a DC voltage during touch sensor mode to attenuate undesired touch signals passing through gate lines 46. Metal lines 92 may have a width W ranging from 500 microns to 600 microns (as an example). Metal lines 92 may be formed from a stack or combination of different types of metals. Metals that may be used in forming metal lines 92 include aluminum, titanium, molybdenum, other suitable metals, or a combination of these metals.

Once color filter layer 28 is secured to TFT layer 30, UV-curable sealant 90 may be cured by exposing sealant 90 to ultraviolet (UV) light. In order for the UV light to cure the adhesive, some or all of the adhesive may be exposed to view from the exterior of the device. Adhesive that is exposed to view from the exterior of the device (e.g., from the color filter side 94 of display 14 and/or from the TFT layer side 96 of display 14) may be accessible by a UV light source and may have a stronger seal than adhesive that is not exposed to view from the exterior of the device.

In conventional devices, holes are formed in the metal lines that lie under the adhesive on the TFT substrate. By forming holes in the metal lines, portions of the UV-curable adhesive that lie above the metal lines are exposed to view from the TFT layer side of the display. Holes of a larger size and greater number will expose more sealant and will thus result in a stronger adhesion. However, such holes reduce the effective width of the metal lines, thereby increasing their resistance.

Figure 11:
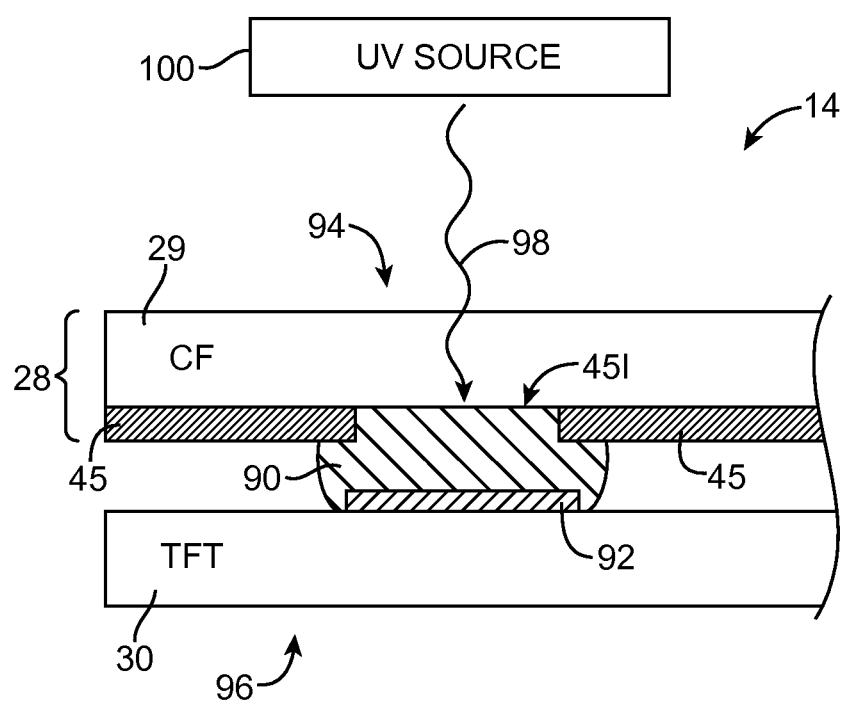
FIG. 11 is a cross-sectional side view of a display having a black masking layer with holes through which ultraviolet light passes to cure the light-curable adhesive in accordance with an embodiment of the present invention.

To overcome the shortcomings of conventional adhesive curing techniques, holes may be formed in the black masking material on the underside of the color filter layer. As discussed in connection with FIG. 5, black masking material 45 may form an opaque border around active area AA of display 14. As shown in FIG. 11, black masking material 45 may have portions that overlap UV-curable sealant 90. Holes such as holes 45I (sometimes referred to as openings) may be formed in black masking material 45 to expose UV-curable sealant 90 from color filter side 94 of display 14. UV-curable sealant 90 may be cured by directing UV-light 98 from UV-light source 100 through opening 45I in black masking material 45.

Figure 12A:
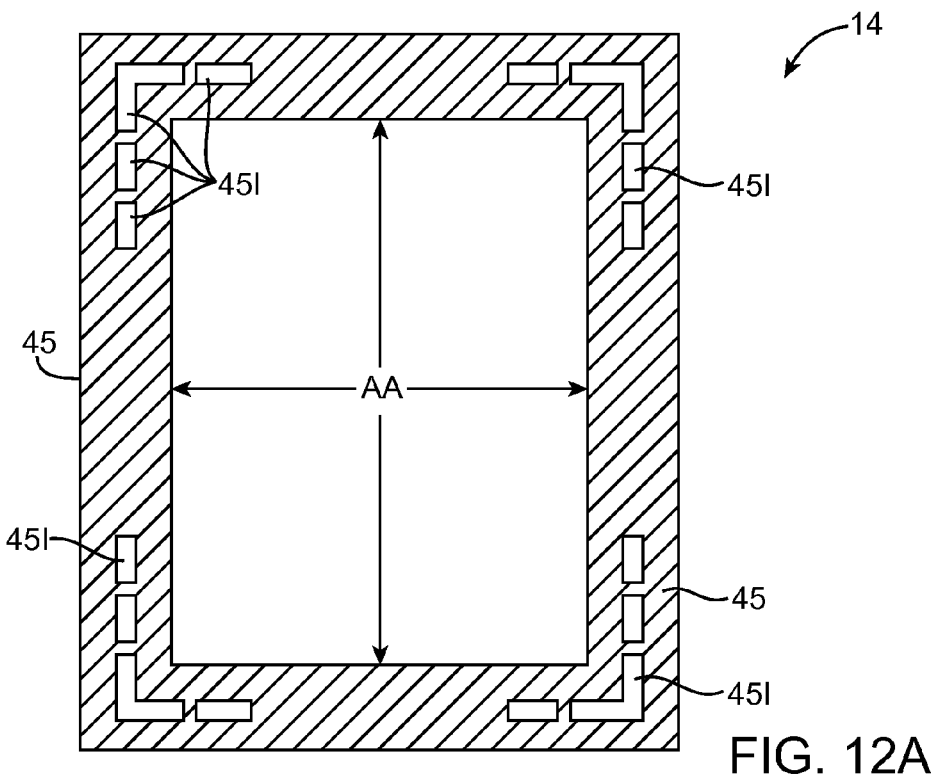
FIG. 12A is a top view of a portion of a display illustrating how holes in the black matrix layer may be formed in different locations around the active area of a display in accordance with an embodiment of the present invention.
Figure 12B:
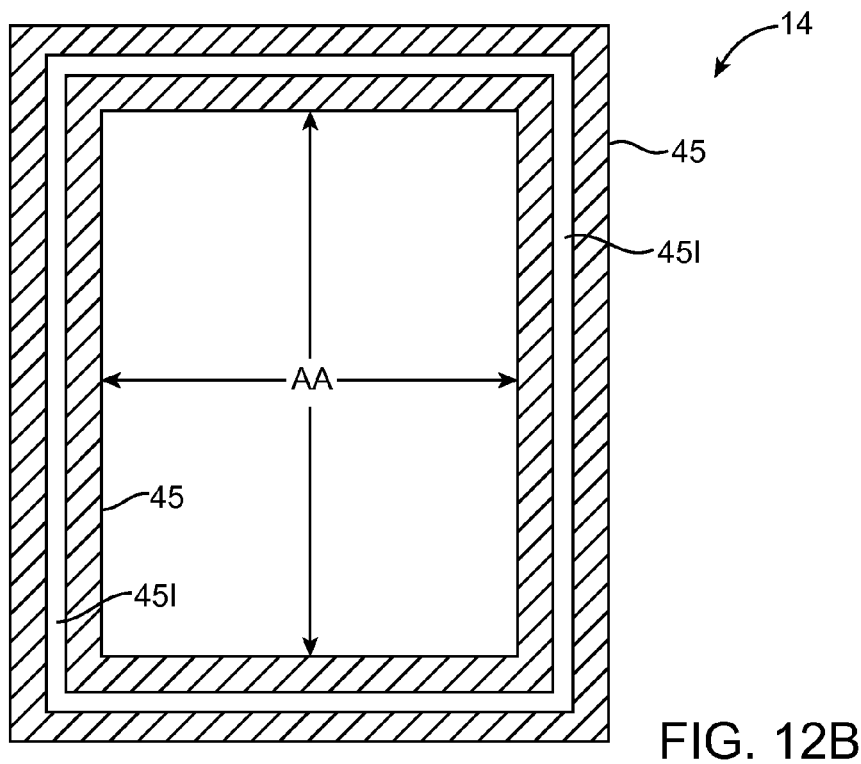
FIG. 12B is a top view of a portion of a display illustrating how holes in the black matrix layer may be formed around the entire periphery of the active area of the display in accordance with an embodiment of the present invention.

The size and number of holes 45I in black masking material 45 may be easily customized. Some areas may benefit from a stronger adhesion and may therefore benefit from larger holes and/or a greater number of holes. For example, a stronger adhesive bond at and around the corners of the display may result in greater mechanical stability and overall robustness of the display. As shown in FIG. 12A, holes 45I may be formed in any desired location. In the example of FIG. 12A, holes 45I are formed in and around the corners of black masking material 45. This is merely illustrative. In general, holes 45I may be formed on one side, on two sides, on three sides, or on all four sides of active area AA of display 14. As shown in the example of FIG. 12B, holes 45I may be formed around the entire periphery of active area AA of display 14 if desired. Holes 45I may be a single opening forming a ring around active area AA of display 14 (as shown in FIG. 12B), or holes 45I may be multiple openings that form a segmented ring around active area AA of display 14.

Figure 13:
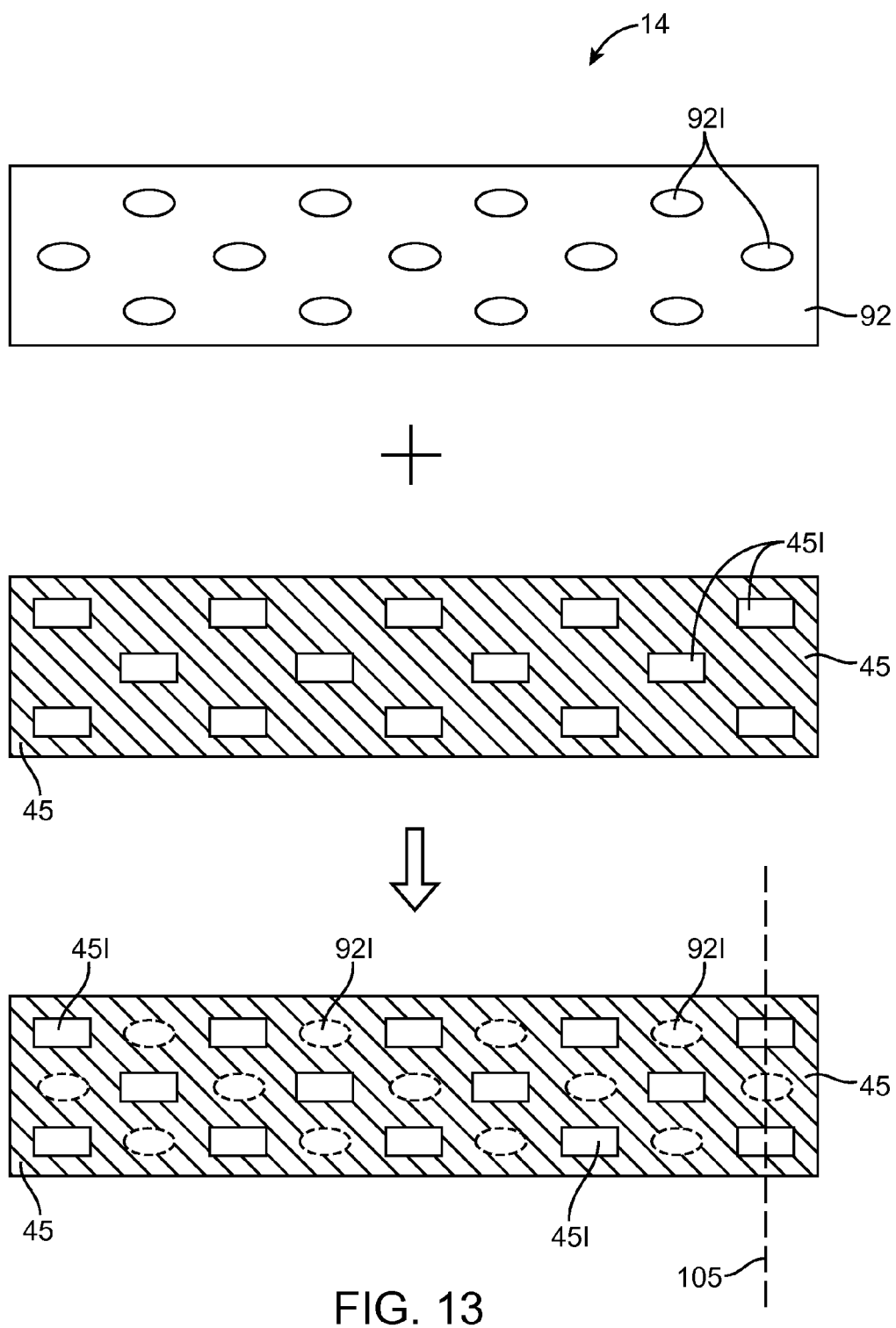
FIG. 13 is a top view of a portion of a display illustrating how the pattern of holes in the black matrix layer may complement the pattern of holes in metal lines such that each hole exposes a distinct portion of light-curable sealant in accordance with an embodiment of the present invention.

If desired, holes 45I in black masking material 45 may be used in addition to holes in metal lines on the TFT layer. As shown in FIG. 13, holes such as holes 92I (sometimes referred to as openings) may be formed in metal lines on TFT layer 30, such as metal lines 92. Holes 92I may expose sealant 90 to view from TFT layer side 96 of display 14. Holes 45I may expose sealant 90 to view from color filter side 94 of display 14. Holes 92I and 45I may have any suitable shape (e.g., a rounded shape, a rectilinear shape, other suitable shape, a combination of these shapes, etc.). Holes 92I and 45I may also have any suitable size and number. If desired, holes 92I may be smaller in size and number than holes 45I to avoid any large increase of resistance in metal lines 92.

Holes 92I may be formed in a pattern that complements holes 45I in black masking layer 34. In the example of FIG. 13, holes 92I are formed in portions of metal lines 92 that are overlapped by solid portions of black masking layer 45. To complement this pattern, holes 45I are formed in portions of black masking layer 45 that overlap solid portions of metal lines 92. With this configuration, each of the plurality of holes 45I and 92I may expose a distinct portion of sealant 90.

Figure 14:
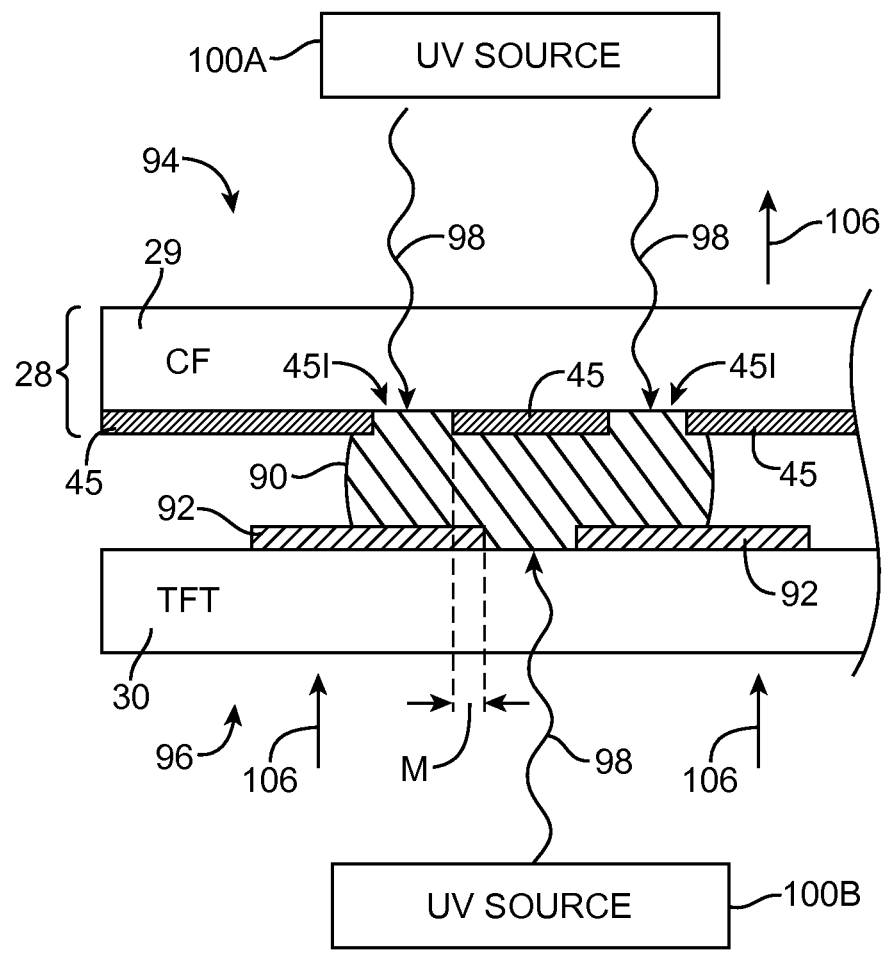
FIG. 14 is a cross-sectional side view of a portion of a display illustrating how the holes of FIG. 13 may be used to cure the light-curable sealant from both sides of the display in accordance with an embodiment of the present invention.

A cross-section taken along axis 105 of FIG. 13 is illustrated in FIG. 14. As shown in FIG. 14, openings 45I in black masking material 45 overlap portions of sealant 90 as well as solid portions of metal lines 92. Openings 92I are overlapped by portions of sealant 90 as well as solid portions of black masking material 45. With this configuration, sealant 90 may be cured from both sides of display 14 (e.g., from color filter side 94 and from TFT layer side 96). As shown in FIG. 14, UV-light source 100A may cure sealant 90 from color filter side 94 by directing UV-light 98 through openings 45I in black masking material 45. UV-light source 100B may cure sealant 90 from TFT layer side 96 by directing UV-light 98 through openings 92I in metal lines 92.

Using a complementary pattern of openings in this way (e.g., where each of openings 45I and 92I exposes a distinct portion of sealant 90) may allow for UV curing of sealing 90 from both sides of display 14. This may decrease the amount of manufacturing time required to form a completed electronic device. The complementary pattern of openings may also increase the area of exposed sealant, thereby enhancing the mechanical stability and robustness of the display.

TFT layer 30 may be interposed between color filter layer 28 and a backlight unit such as backlight unit 41 of FIG. 5. As described in connection with FIG. 5, backlight unit 41 may provide backside illumination (e.g., may direct light from TFT layer side 96 upwards in direction 106 of FIG. 14). Holes 45I and 92I may be formed such that holes 45I do not overlap holes 92I. This ensures that light from the backlight unit does not leak through the inactive area of the display via holes 92I and/or holes 45I. There may be a minimum spacing such as spacing M between openings 45I in black masking material 45 and openings 92I in metal lines 92. Spacing M may range from 2.5 microns to 3.5 microns. Using an opaque sealing material for sealant 90 may also help reduce or eliminate light leakage in the inactive area of the display.

Figure 15:
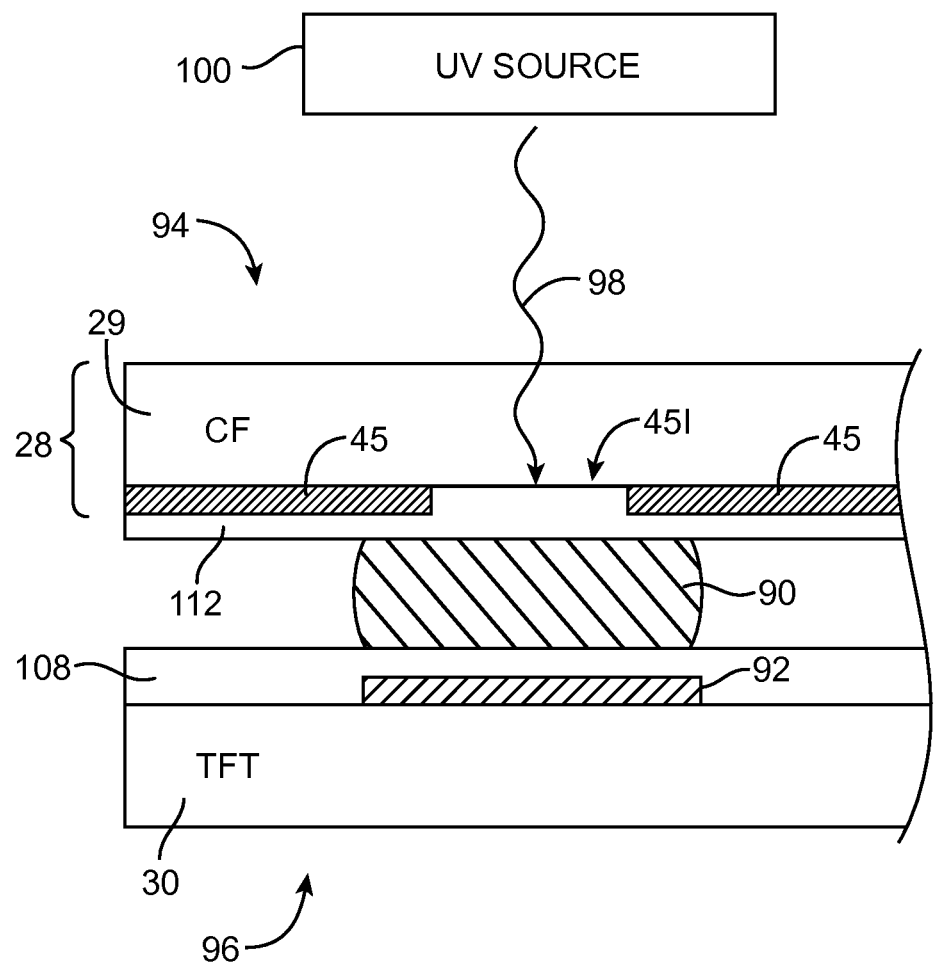
FIG. 15 is a cross-sectional side view of a portion of a display illustrating additional layers that may be included above and below the light-curable sealant in accordance with an embodiment of the present invention.

Other layers that may be interposed between color filter layer 28 and TFT layer 30 are shown in FIG. 15. As shown in FIG. 15, an overcoat layer such as transparent overcoat layer 112 may be interposed between black masking material 45 and UV-sealant 90. Overcoat layer 112 may be formed from an acrylic-based polymer and may be used to planarize the interior surface of color filter layer 30 and black masking material 45.

A passivation layer such as passivation layer 108 may be interposed between UV-curable sealant 90 and metal lines 92. Passivation layer 108 may be formed by depositing a layer of oxide over metal lines 92. Passivation layer 108 may be include a combination or stack of organic and inorganic materials.

Figure 16:
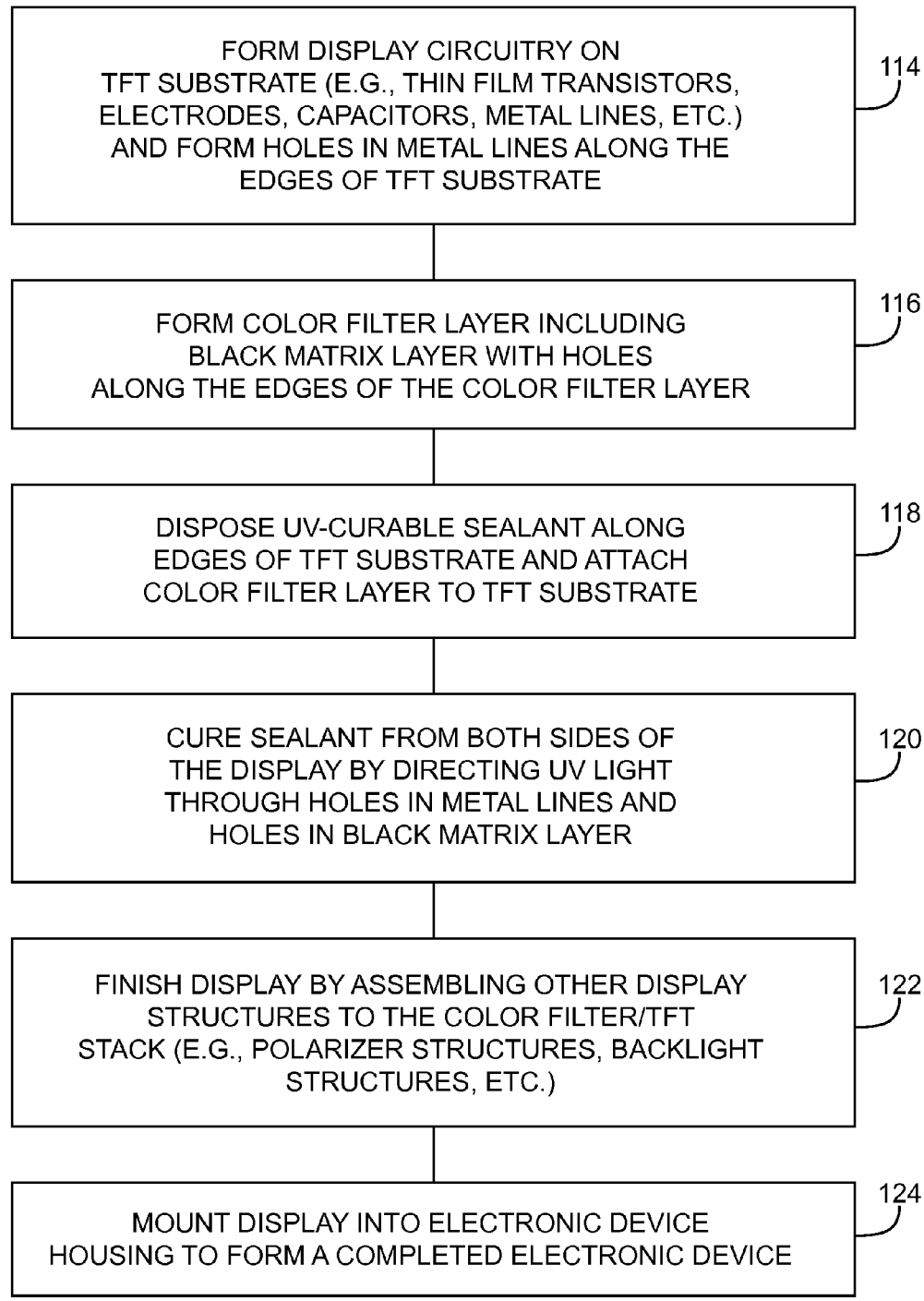
FIG. 16 is a flow chart of illustrative steps involved in forming an electronic device with a display of the type shown in FIG. 14 in accordance with an embodiment of the present invention.

Illustrative steps involved in forming an electronic device with a display of the type shown in FIGS. 1-15 are shown in FIG. 16. At step 114, display circuitry 30A may be formed on TFT substrate 30B. Display circuitry 30A may include pixel circuitry, thin-film transistors, metal lines, capacitors, electrodes for controlling the electric fields that are applied to liquid crystal layer 32, and capacitive touch sensor electrodes. Step 114 includes forming holes 92I in metal lines 92 along the edges of TFT substrate 30B.

At step 116, color filter array 31 may be formed on color filter substrate 29. Step 116 includes forming black matrix layer 45 on the interior surface of color filter substrate 29. Black matrix layer 45 may be provided with holes 45I along the edges of color filter layer 28. As discussed in connection with FIGS. 13 and 14, holes 45I and 92I may be patterned such that holes 45I do not overlap holes 92I once color filter layer 28 is attached to TFT layer 30.

At step 118, UV-curable sealant 90 may be disposed along the edges of TFT layer 30. UV-curable sealant 90 may have portions that overlap metal lines 92 on TFT substrate 30B. After applying sealant 90 to TFT substrate 30B, color filter layer 28 may be attached to TFT substrate 30B. Holes 45I in black matrix layer 45 may overlap portions of UV-curable sealant 90.

At step 120, UV-curable sealant 90 is cured from both sides of display 14 by shining UV-light through holes 45I in black matrix layer 45 and through holes 92I in metal lines 92. Once sealant 90 is cured, other display structures may be assembled with the color filter/TFT stack (step 122). Other display structures that may be added to the stack include upper polarizer 39, lower polarizer 40, backlight unit 41, optical films, etc. At step 124, the finished display may be mounted into an electronic device housing to form a completed electronic device.

The foregoing is merely illustrative of the principles of this invention and various modifications can be made by those skilled in the art without departing from the scope and spirit of the invention.

What is claimed is:

1. A display having an active area with an edge, comprising:
    a first transparent substrate;
    a second transparent substrate;
    black masking material on the second transparent substrate, wherein the black masking material surrounds the active area and forms a rectangular ring having four corner regions; and
    sealant interposed between the black masking material and the first transparent substrate, wherein the black masking material includes a plurality of openings configured to allow sealant-curing light to pass through the second transparent substrate to the sealant, wherein the plurality of openings are interposed between the edge of the active area and an outermost edge of the second transparent substrate, wherein the plurality of openings are segmented along a length that runs parallel to the edge of the active area and to the outermost edge of the second transparent substrate, and wherein the openings are distributed non-uniformly throughout the black masking material such that a density of the openings in the black masking material is greater in each of the four corner regions than in other regions of the black masking material.

2. The display defined in claim 1 further comprising liquid crystal material interposed between the first and second transparent substrates, wherein the first and second transparent substrates have peripheral edges and wherein the sealant is configured to prevent leakage of the liquid crystal material at the peripheral edges.

3. The display defined in claim 2 further comprising a metal line on the first transparent substrate, wherein the sealant overlaps at least part of the metal line.

4. The display defined in claim 3 wherein the metal line includes at least one opening configured to allow sealant-curing light to pass through the first transparent substrate to the sealant.

5. The display defined in claim 4 wherein the black masking material and the metal line include solid portions without openings, wherein one of the solid portions in the black masking material overlaps the at least one opening in the metal line, and wherein the at least one opening in the black masking material overlaps one of the solid portions of the metal line.

6. The display defined in claim 3 further comprising thin-film transistor circuitry on the first transparent substrate.

7. The display defined in claim 6 further comprising:
    gate lines on the first transparent substrate that control the thin-film transistor circuitry; and
    gate line driver circuitry that receives at least one signal on the metal line and is configured to drive gate line signals onto the gate lines.

8. The display defined in claim 6 wherein the second transparent substrate comprises a color filter array having color filter element openings formed in the black masking material.

9. The display defined in claim 8 further comprising touch sensor electrodes on the first transparent substrate.

10. The display defined in claim 2 wherein the sealant comprises ultraviolet-light-curable epoxy.

11. A method, comprising:
    forming a metal line on a first display substrate, wherein the metal line is contagious and free of openings;
    forming a black masking layer on a second display substrate, wherein the black masking layer forms a rectangular ring having four corner regions, wherein the black masking layer overlaps the metal line and has at least one opening, wherein a width of the metal line is larger than a width of the at least one opening such that the metal line completely overlaps the at least one opening, wherein the at least one opening comprises a plurality of openings, and wherein at least some of the openings are located in the corner regions of the black masking layer;
    placing sealing adhesive between the first and second display substrates so that the sealing adhesive overlaps the metal line; and
    curing the sealing adhesive by applying ultraviolet light to the sealing adhesive through the at least one opening in the black masking layer, wherein the openings in the corner regions of the black masking later transmit more of the ultraviolet light than openings in other regions of the black masking layer.

12. The method defined in claim 11 further comprising:
    forming a color filter array on the second display substrate, wherein the color filter array includes color filter element openings formed in the black masking layer.

13. The method defined in claim 12 further comprising:
    forming thin-film transistor circuitry on the first display substrate;
    forming gate driver circuitry on the first display substrate, wherein the gate driver circuitry is configured to receive at least one signal on the metal line.

14. A liquid crystal display having a periphery, comprising:
    a thin-film transistor layer having a substrate with at least one metal line, wherein the thin-film transistor layer comprises touch sensor electrodes, thin-film transistor circuitry, gate lines that control the thin-film transistor circuitry, and the gate line driver circuitry that receives at least one signal on the metal line, and wherein the gate line driver circuitry is configured to drive gate line signals onto the gate lines during a first mode of operation and to hold the gate lines at a voltage during a second mode of operation;
    a color filter layer having a substrate with a black matrix layer, wherein the black matrix layer has at least one opening that overlaps the at least one metal line and wherein the black matrix layer has a portion that forms a rectangular ring having four corner regions;
    a layer of liquid crystal material interposed between the thin-film transistor layer and the color filter layer; and
    ultraviolet-light-curable sealant that is interposed between the thin-film transistor layer and the color filter layer, wherein the ultraviolet-light-curable sealant surrounds the liquid crystal material and prevents leakage of the liquid crystal material at the periphery of the display, and wherein the at least one opening in the black matrix layer overlaps the ultraviolet-light-curable sealant, wherein the at least one opening comprises a plurality of openings having different sizes, and wherein the openings in the corner regions of the black matrix layer are larger than the openings in other regions of the black matrix layer.

15. The liquid crystal display defined in claim 14 wherein the black matrix layer comprises a peripheral border region, wherein the plurality of openings is distributed along the peripheral border region, and wherein each of the openings overlaps the ultraviolet-light-curable sealant.

16. The liquid crystal display defined in claim 15 wherein the at least one metal line has an additional plurality of openings and wherein the ultraviolet-light-curable sealant overlaps the additional plurality of openings.

17. The liquid crystal display defined in claim 16 wherein the plurality of openings overlaps a first portion of the ultraviolet-light-curable sealant and wherein the additional plurality of openings overlaps a second portion of the ultraviolet-light-curable sealant.

18. The liquid crystal display defined in claim 14 wherein the second mode of operation comprises a touch sensor mode of operation during which the touch sensor electrodes are used to gather touch input from a user.

19. The liquid crystal display defined in claim 18 wherein at least some of the touch sensor electrodes are used to control the liquid crystal material during the first mode of operation.

20. The liquid crystal display defined in claim 14 wherein the gate line driver circuitry includes switching circuitry for switching between the first mode of operation and the second mode of operation.

* * * * *

UNITED STATES PATENT AND TRADEMARK OFFICE
CERTIFICATE OF CORRECTION

PATENT NO. : 8,982,310 B2  Page 1 of 1
APPLICATION NO. : 13/326713
DATED : March 17, 2015
INVENTOR(S) : Abbas Jamshidi Roudbari et al.

It is certified that error appears in the above-identified patent and that said Letters Patent is hereby corrected as shown below:

In the Claims

In claim 11, column 12, line 5, delete "the metal line is contagious" and insert --the metal line is contigious--.

In claim 14, column 12, line 40, delete "and the gate line driver circuitry" and insert --and gate line driver circuitry--.

Signed and Sealed this
Twenty-eighth Day of July, 2015

Michelle K. Lee
*Director of the United States Patent and Trademark Office*